US011067217B1

(12) United States Patent
Alvarez

(10) Patent No.: US 11,067,217 B1
(45) Date of Patent: Jul. 20, 2021

(54) MOUNTING MEMBER FOR A SPONGE

(71) Applicant: Abdel Alvarez, Miami, FL (US)

(72) Inventor: Abdel Alvarez, Miami, FL (US)

( * ) Notice: Subject to any disclaimer, the term of this patent is extended or adjusted under 35 U.S.C. 154(b) by 94 days.

(21) Appl. No.: 16/673,013

(22) Filed: Nov. 4, 2019

(51) Int. Cl.
| | |
|---|---|
| *A47B 96/06* | (2006.01) |
| *F16M 13/00* | (2006.01) |
| *F16M 13/02* | (2006.01) |
| *B08B 13/00* | (2006.01) |
| *A47L 17/00* | (2006.01) |
| *B08B 1/00* | (2006.01) |
| *F16B 47/00* | (2006.01) |

(52) U.S. Cl.
CPC ........... *F16M 13/005* (2013.01); *A47L 17/00* (2013.01); *B08B 1/006* (2013.01); *B08B 13/00* (2013.01); *F16B 47/00* (2013.01); *F16M 13/022* (2013.01)

(58) Field of Classification Search
CPC .... F16M 13/005; F16M 13/022; F16M 13/00; A47L 17/00; B08B 1/006; F16B 47/00; F16B 2200/30
See application file for complete search history.

(56) References Cited

U.S. PATENT DOCUMENTS

| | | | | |
|---|---|---|---|---|
| 1,694,235 A | * | 12/1928 | Schoenfelder ........... | A47K 5/02 248/206.4 |
| 2,315,566 A | * | 4/1943 | Watral ................... | A47K 10/04 211/123 |
| 3,186,671 A | * | 6/1965 | Standley ................ | B60N 3/103 248/302 |
| 5,217,123 A | * | 6/1993 | Riley ..................... | A47K 10/08 211/105.1 |
| 8,662,463 B2 | * | 3/2014 | Chen ...................... | F16B 47/00 248/309.3 |

FOREIGN PATENT DOCUMENTS

| | | |
|---|---|---|
| FR | 2631224 A1 | 11/1989 |
| WO | WO 2018/088990 | 5/2018 |

* cited by examiner

*Primary Examiner* — Amy J. Sterling
(74) *Attorney, Agent, or Firm* — Sanchelima & Associates, P.A.; Christian Sanchelima; Alexander Rodriguez

(57) ABSTRACT

A mounting member for a sponge including a mounting assembly, a cutting assembly, a cap assembly, a sponge assembly and a sink assembly in disclosed. The mounting assembly includes a suction cup that includes a base opening for receiving the cutting assembly therein. The cutting assembly includes a shaft having a threaded portion around the perimeter of the shaft. Importantly, at a distal end of the shaft is a cutting blade capable of cutting a sponge opening on a sponge. The sponge can be mounted to the cutting assembly or the cap assembly. The cap assembly conceals the shaft and the cutting blade to reduce risk of accidental injury. The mounting assembly is mounted to a basin of the sink assembly to allow for the effective drainage of water absorbed by the sponge onto a basin floor and through a basin drain.

17 Claims, 9 Drawing Sheets

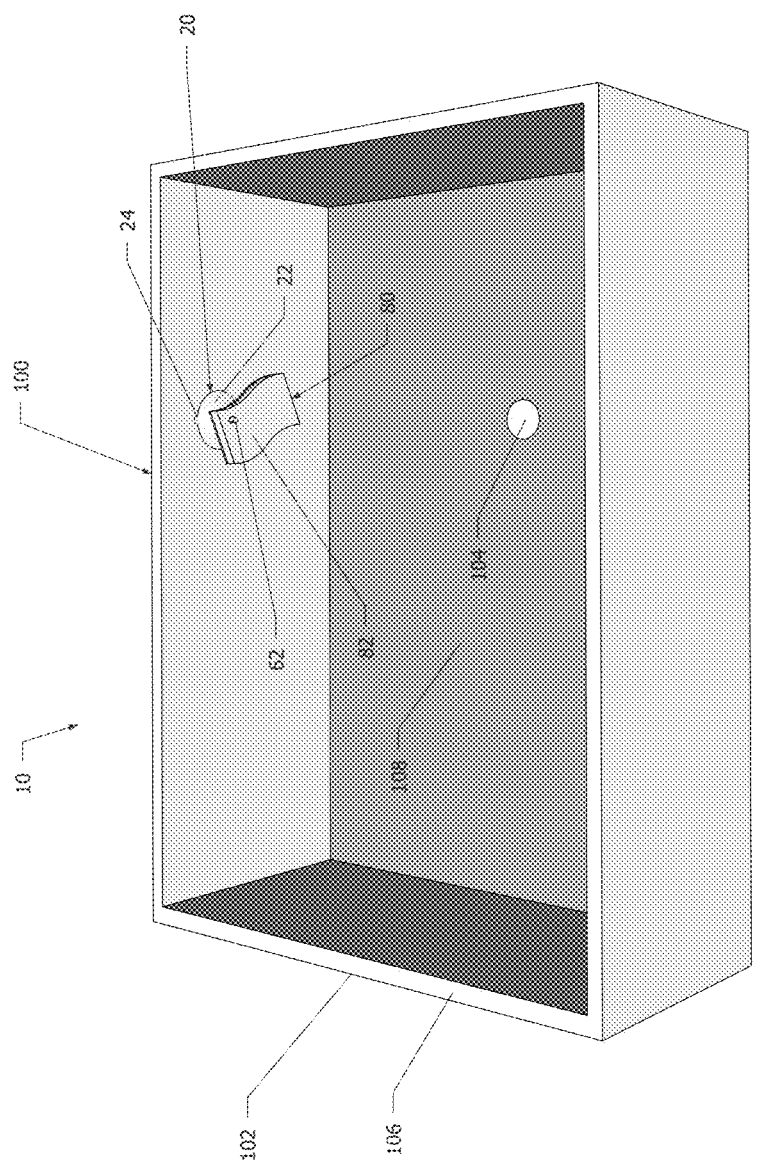

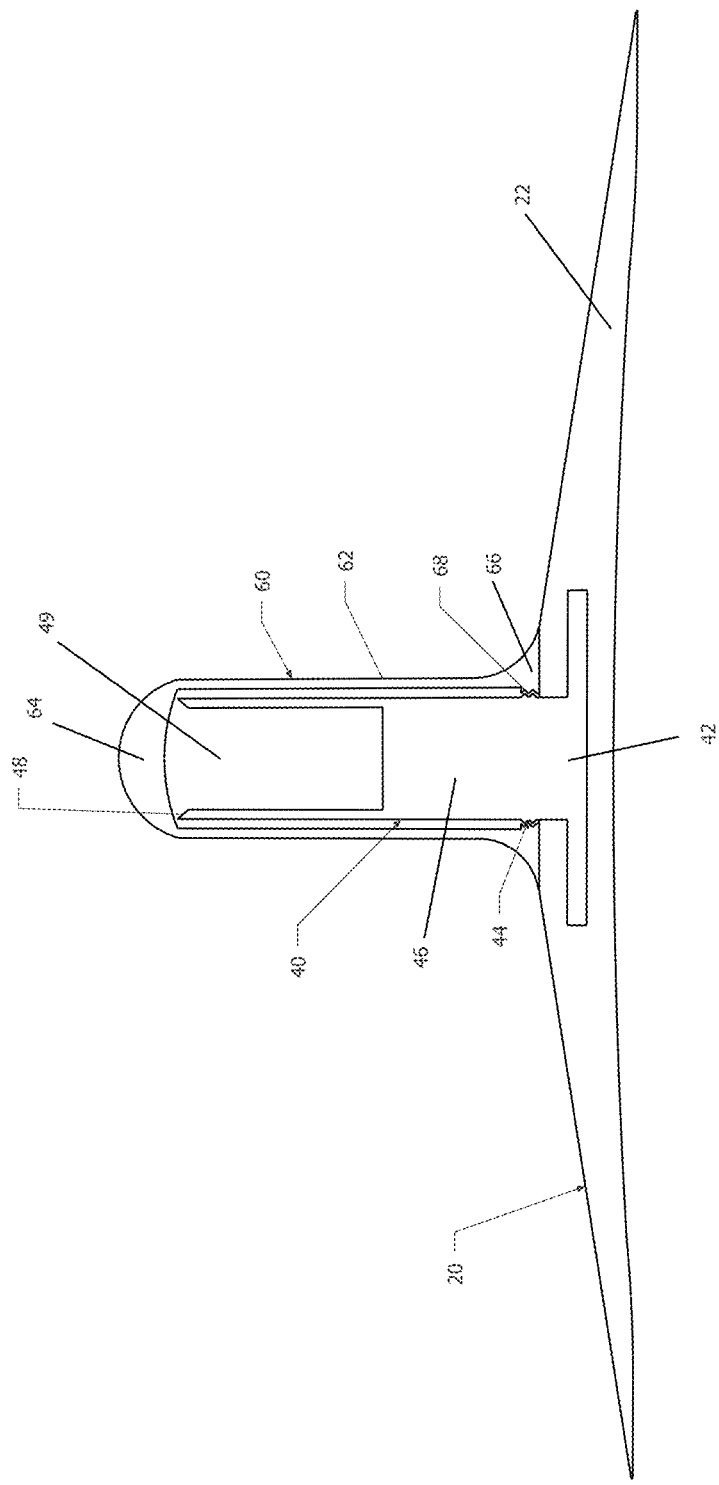

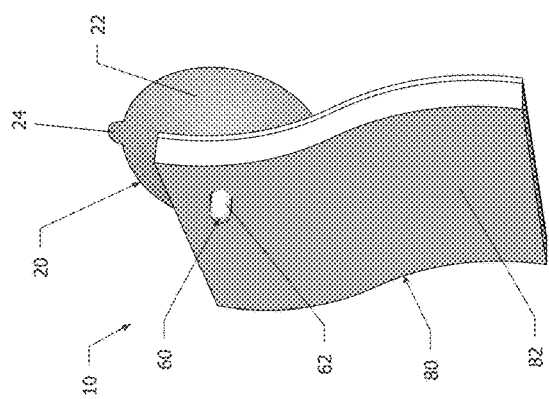
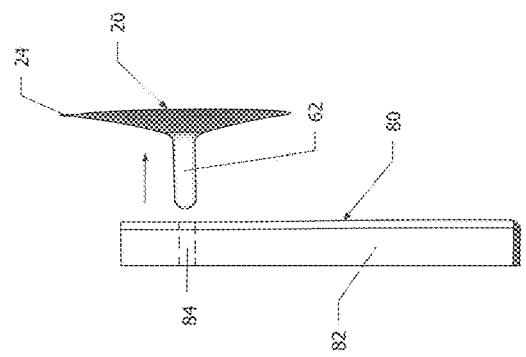
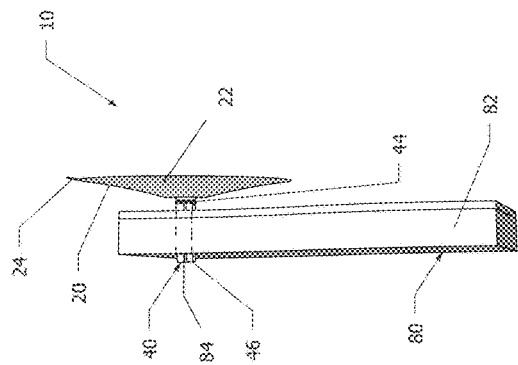
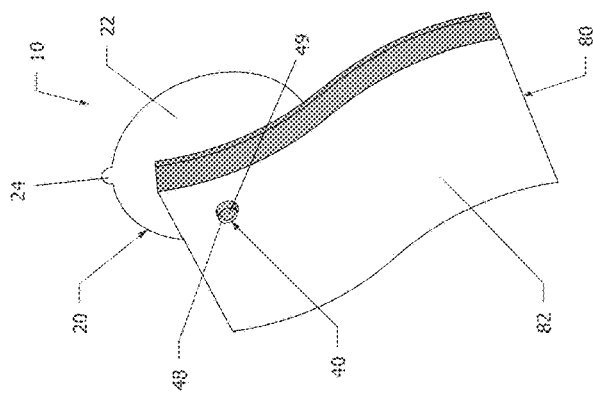

MOUNTING MEMBER FOR A SPONGE

BACKGROUND OF THE INVENTION

1. Field of the Invention

The present invention relates to a mounting member for a sponge and, more particularly, to a universal sponge mounting member that includes a suction cup for mounting a sponge against a surface that also allows for the effective drainage of water absorbed by the sponge.

2. Description of the Related Art

Several designs for a mounting member for a sponge have been designed in the past. None of them, however, include a mounting member being a suction cup that further includes a protruding cutter that is capable of cutting a hole in the sponge to then allow mounting of the sponge to that same protruding cutter mounted thereon the suction cup. The suction cup mounts to a surface and holds the sponge in order to permit the sponge to dry and get rid of excess water through dripping, preferably into a sink.

Applicant believes that a related reference corresponds to International Application under the Patent Cooperation Treaty No. WO 2018/088990 for Suction Enabled Sponge Holder. Applicant believes another related reference corresponds to France Patent No. FR2631224 for a Device for washing, in particular the back, washing installation comprising such a device, and method using this installation. None of these references, however, teach of a suction cup that includes a cutting member that is capable of cutting a hole into any sponge for retrofitting the sponge thereon to allow removal of excess water through dripping, preferably into a sink.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a mounting member for a sponge that includes a cutter for cutting an opening through the sponge to allow mounting of the sponge onto the mounting member.

It is another object of this invention to provide a mounting member for a sponge that can be used with any existing sponge.

It is still another object of the present invention to provide a mounting member for a sponge wherein the mounting means include a suction cup.

It is still yet another object of the present invention to provide a mounting member for a sponge that allows mounting of the sponge against a surface such as against a basin, for example.

It is another object of the present invention to provide a mounting member for a sponge that allows for the effective drainage of water absorbed by the sponge.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents the present invention in an operational setting mounted to a sink assembly 100.

FIG. 15 represents a see-through view of the present invention as shown in FIG. 14, wherein the mounting assembly 20 has the cap assembly 60 engaging the cutting assembly 40 to entirely cover the cutting assembly for providing safety from accidental cuts by the cutting blade 48 to the user, helping to demonstrate the fitment of the mounting assembly 20, the cutting assembly 40 and the cap assembly together.

FIG. 16 shows how the cutting assembly 40, which is mounted to the mounting assembly 20, creates the sponge opening 84 on sponge 82.

FIG. 17 illustrates a side view of the cutting assembly 40 creating the sponge opening 84 on the sponge 82.

FIG. 17A shows how the mounting assembly 20 having the cap assembly 60 mounted onto is to engage the sponge 82 through the sponge opening 84 created by the cutting assembly 40.

FIG. 18 illustrates the sponge 82 mounted onto the cap assembly 60 for ready for mounting of the present invention to a surface.

DETAILED DESCRIPTION OF THE EMBODIMENTS OF THE INVENTION

Figure 3:
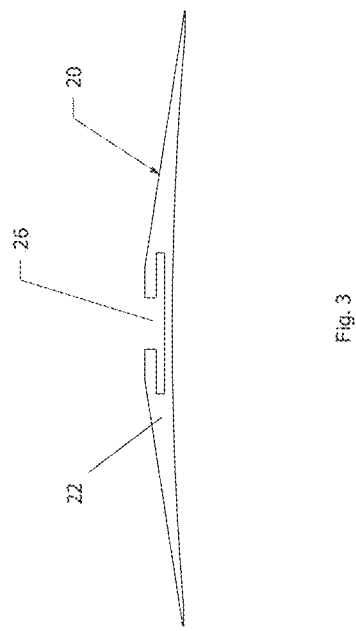
FIG. 3 illustrates a see-through view of the suction cup 22 to show the configuration and depths of the base opening 26 within suction cup 22.

Referring now to the drawings, where the present invention is generally referred to with numeral 10, it can be observed that it, a mounting member for a sponge 10, basically includes a mounting assembly 20, a cutting assembly 40, a cap assembly 60, a sponge assembly 80 and a sink assembly 100.

Figure 2:
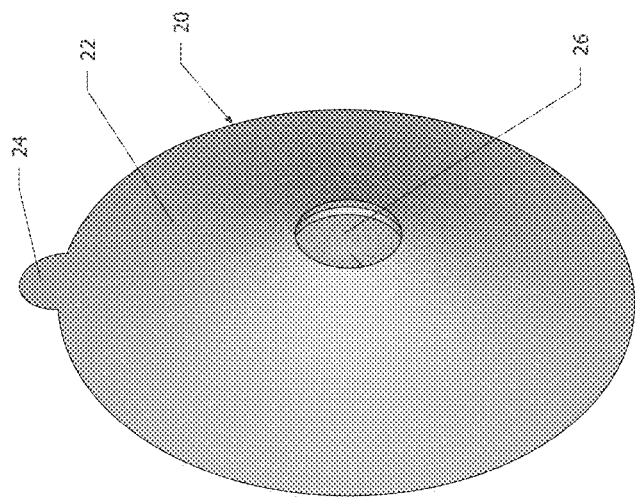
FIG. 2 shows an isometric view of the suction cup 22 of the mounting assembly 20.
Figure 7:
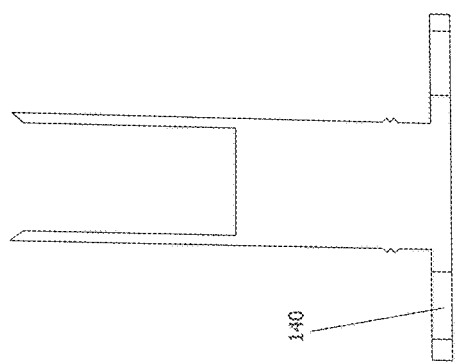
FIG. 7 represents a see-through view of cutting assembly 40 in an alternate embodiment in which base 42 includes base through holes 142 which may aid in maintaining base 42 secure within suction cup 22 during usage of the present invention.
Figure 6:
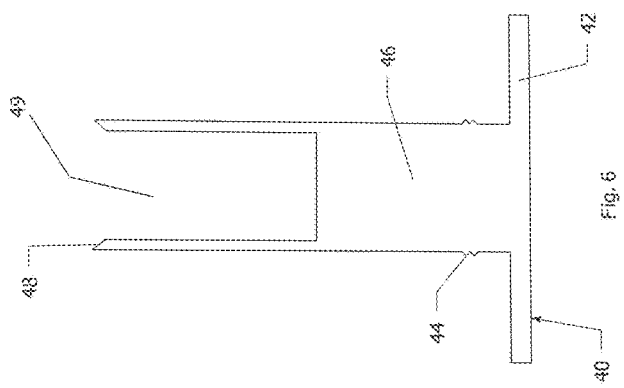
FIG. 6 illustrates a see-through view of cutting assembly 40 showing the depths of shaft opening 49.
Figure 5:
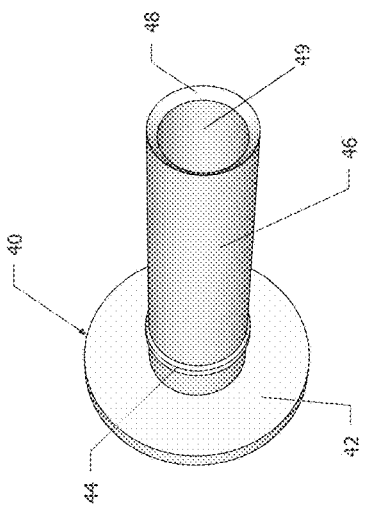
FIG. 5 shows an isometric top view of the cutting assembly 40 to illustrate the cutting blade 48 and shaft opening 49.
Figure 4:
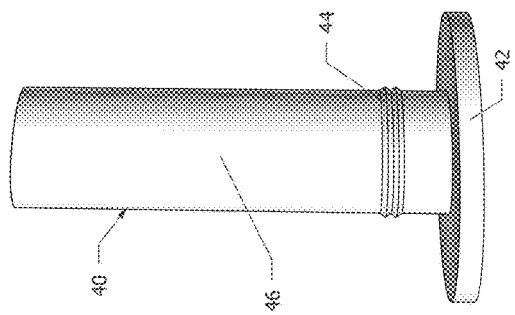
FIG. 4 represents an isometric view of the cutting assembly 40 of the present invention.
Figure 10:
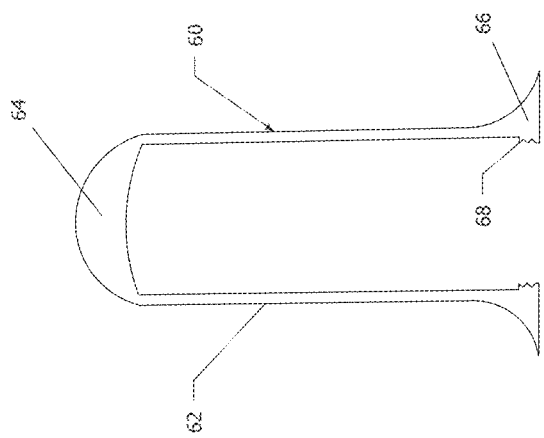
FIG. 10 represents a see-through view of the cap member 62 showing the depths the cap opening and also showing the cap threads 68 which engage cutting assembly 40 to secure cap member 62 to base 42.
Figure 9:
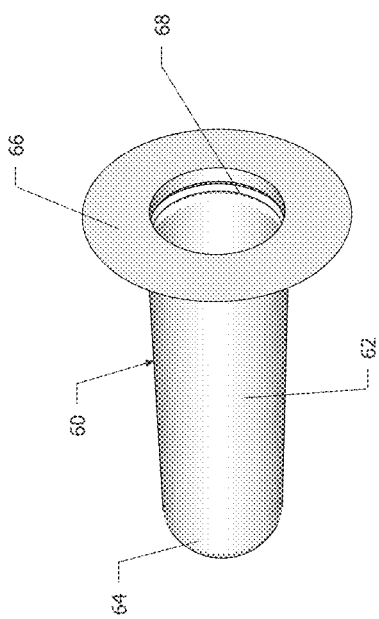
FIG. 9 illustrates an isometric bottom view of the cap member 62 showing the cap opening and opening and also showing the cap threads 68 which engage cutting assembly 40 to secure cap member 62 to base 42.
Figure 8:
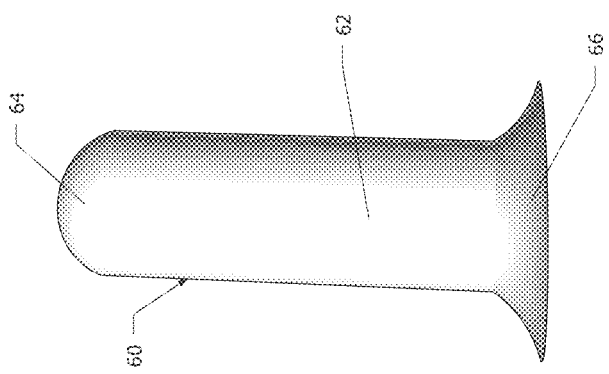
FIG. 8 shows an isometric view of the cap member 62 of the cap assembly 60.
Figure 12:
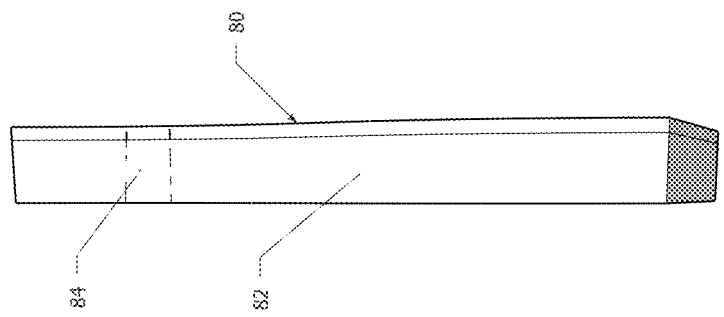
FIG. 12 illustrates a side view of the sponge 82 showing how sponge opening 84 extends through the sponge 82.
Figure 11:
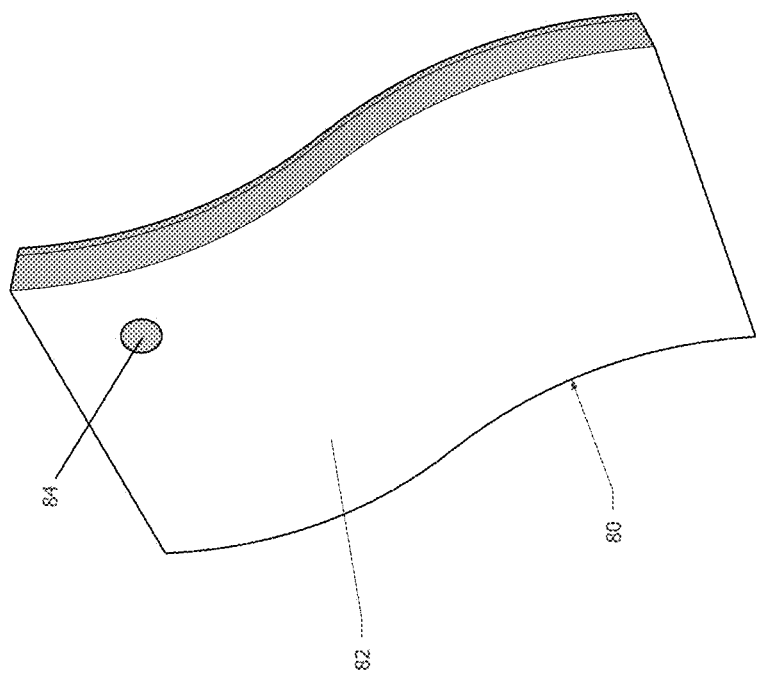
FIG. 11 shows an isometric view of the sponge 82 of the sponge assembly 80 already having a sponge opening 84.
Figure 14:
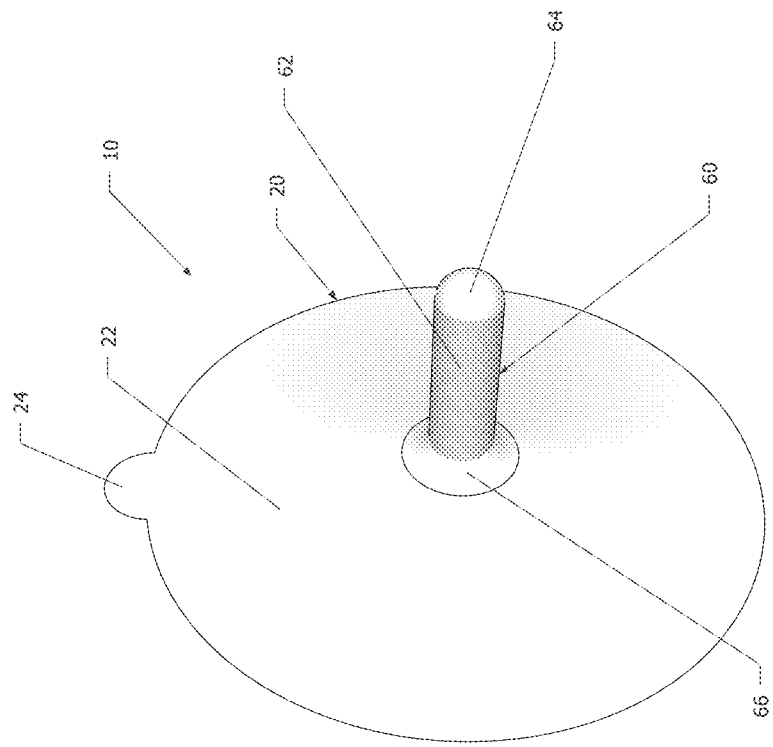
FIG. 14 illustrates an isometric view of the present invention with the mounting assembly 20 having the cap assembly 60 engaging the cutting assembly 40 to entirely cover the cutting assembly for providing safety from accidental cuts by the cutting blade 48 to the user.
Figure 13:
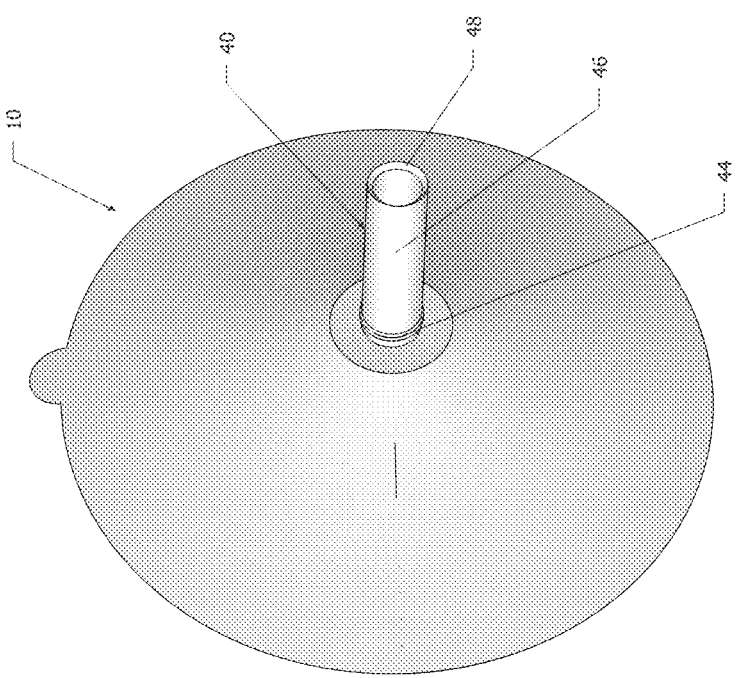
FIG. 13 shows an isometric view of the mounting assembly 20 with the cutting assembly 40 mounted thereto, further showing the present invention assembled.

The present invention, mounting member for a sponge 10, can be seen in FIGS. 1-21. It can be seen that the present invention includes mounting assembly 20 which includes mounting means. Mounting assembly 20 can be best seen in FIGS. 1-2. Importantly, mounting assembly 20 includes suction cup 22 as the mounting means. Suction cup 22 may have a bottom surface and a top surface. Suction cup 22 may preferably be made of a rubber material. It may be suitable for suction cup 22 to be made of other materials such as silicone, synthetic rubber or other elastomer material, vinyl, urethane or the like as known in the art. It is essential that suction cup 22 be made of an airtight material in order to properly and securely attach to a surface with air pressure. In one embodiment, suction cup 22 may be substantially oval shaped. However, it should be understood that suction cup 22 may be of a predetermined shape and dimensions. The bottom surface of suction cup 22 may preferably be concave at a center with flat spreading sides in order to adhere to a flat surface. At a predetermined location along the circumference of suction cup 22 may be a release tab 24 which partly extends beyond the peripheral edge of suction cup 22 adapted to facilitate removal of suction cup 22 from the surface attached thereto. Suction cup 22 may include a base opening 26. Base opening 26 may be centrally located on suction cup 22. Base opening 26 may be adapted to house and secure cutting assembly 40 within mounting assembly 20. Preferably, base opening 26 may be of a shape and dimension that cooperates with a base 42 of cutting assembly 40. Cutting assembly 40 may protrude from suction cup 22 through base opening 26.

It can be seen that the present invention further includes cutting assembly 40 as best shown and seen in FIGS. 4-7. Cutting assembly 40 may be mounted to mounting assembly 20. Cutting assembly 40 may be partially housed within suction cup 22 and partially extending from suction cup 22. Cutting assembly 40 includes base 42. In one embodiment, base 42 may be circular. However, it should be understood that base 42 may be of a predetermined shape and dimensions. Base 42 may preferably be wider than base opening 26. Base 42 may take up the entire area of base opening 26. Cutting assembly 40 may further include a shaft 46. Shaft 46 may preferably be cylindrical. Shaft 46 may extend upwardly a predetermined amount. Shaft 46 may preferably be substantially smooth on an outer surface thereof. On shaft 46 may be a threaded portion 44 at a predetermined location on shaft 46. Threaded portion 44 may be about a perimeter of shaft 46. In an alternate embodiment, base 42 may include through holes 142 which may allow for suction cup 22 to mold around base 42 to better secure base 42 within suction cup 22. Cutting assembly 40 may also include cutting blade 48 at a distal end of shaft 46. More specifically, cutting blade 48 may extend about a circumference of shaft 46 a top end of shaft 46. Cutting blade 48 may be adapted interact with sponge assembly 80 which includes a sponge 82. Sponge assembly 80 may be best seen in FIG. 11-12. Cutting blade 48 may cut a sponge opening 84 into sponge 82. Cutting blade 48 may be thinner than any remaining part of shaft 46. Preferably, cutting blade 48 may be sharp enough to cut through materials such as those of sponge 82 to create sponge opening 84 therethrough. It should be understood that cutting blade 48 may extend along a perimeter of shaft 46 to take on a same shape as shaft 46. For example, in an embodiment in which shaft 46 is squared, cutting blade 48 may extend along the perimeter of the square shaped shaft 46 and take on a same shape. Centrally located partially through shaft 46 may be a shaft opening 49. Shaft opening 49 may extend within shaft 46 a predetermined amount. It may be suitable for shaft opening 49 to have a shape and dimensions that corresponds with the shape and dimensions of shaft 46. Shaft opening 49 may be adapted to gather left over material from cutting sponge opening 84 through sponge 82. Further, shaft opening 49 may additionally be necessary to create cutting blade 66 on shaft 46.

Further included in the present invention may be cap assembly 60. Cap assembly 60 may include cap member 62. In one embodiment, it may be suitable for cap member 2 to be of a shape and dimension that cooperates with shaft 46. Cap member 62 may be substantially hollow to be able to entirely cover shaft 46. Cap member 62 may be removably mounted to cutting assembly 40. In one embodiment, cap member 62 may be tapered upwardly starting from a cap base 66. Cap member 62 may flare outwardly at cap base 66. Cap member 62 may be rounded or domed at a distal end as shown by a cap end 64 located at the distal end. Cap member 62 may further include cap threads 68 on a lower interior surface of cap member 62. Cap threads 68 may engage and cooperate with threaded portion 44 of base 42. Thereby allowing secure attachment of cap member 62 with base 42. Cap member 68 helps to provide safety to a user U to avoid accidental injury or cuts from cutting blade 48.

In an operational setting, the present invention, may be mounted to sink assembly 100 which may include a basin 102 having basin sidewalls 106 and a basin floor 108. Basin sidewalls 106 may extend from basin floor 108. It should be understood that basin 102, basin sidewalls 106 and basin floor 108 may be of predetermined shaped and dimensions. It should be understood that user U may take sponge 82 and create sponge opening 94 at a desired predetermined location therethrough sponge 82 with cutting blade 48. Once sponge opening 84 has been created, suction cup 22 may be mounted to one of basin sidewalls 106. When suction cup 22 is mounted to one of basin sidewalls 106, cutting assembly 40 may be parallel to basin floor 108. Further, cutting assembly 40 may be perpendicular to suction cup 22. It may be preferable for cutting assembly 40 to be covered by cap assembly 60 after creating sponge opening 84, however it may not be necessary. It may be suitable to have shaft 46 and cutting blade 48 exposed when mounting suction cup 22 to one of basin sidewalls 106. Suction cup 22 may be easily removed from the attached of basin sidewalls 106 with the aid of release tab 24 to then be mounted to another of basin sidewalls 106 or any other flat surface. Sponge 82 can be mounted onto cap member 62 covering shaft 46 or directly onto shaft 46. Sponge 82 may be virtually orientated endlessly. It may be suitable to orient sponge 82 vertically, horizontally, diagonally or as user U desires. Once sponge 82 has been used by user U to clean any desired surface it may then be mounted onto cutting assembly 40 or cap assembly 60 for storage. Sponge 82 becomes wet during usage. The present invention allows for the effective drainage of water from sponge 82 through a basin drain 104 on basin floor 108. Sponge 82 may have a mounted configuration and an unmounted configuration. The mounted configuration may be when sponge 82 is being stored and not in use. The unmounted configuration may be when sponge 82 is being used and not mounted to shaft 46 or cap cover 62.

Figure 21:
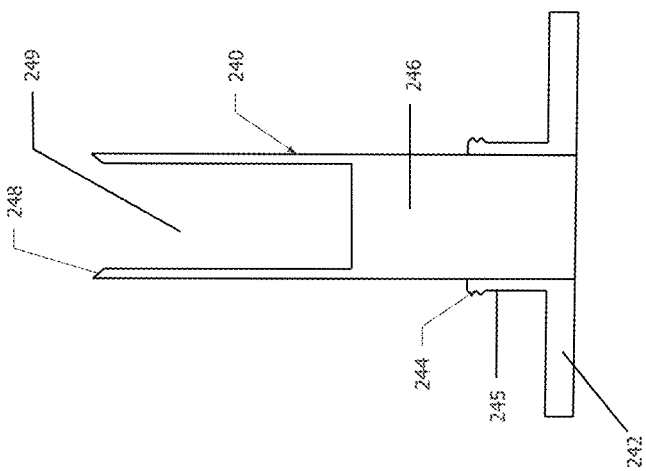
FIG. 21 illustrates a see-through view of the cutting assembly 240 in the alternate embodiment in which the shaft 246 is received within the cutting base 242.
Figure 20:
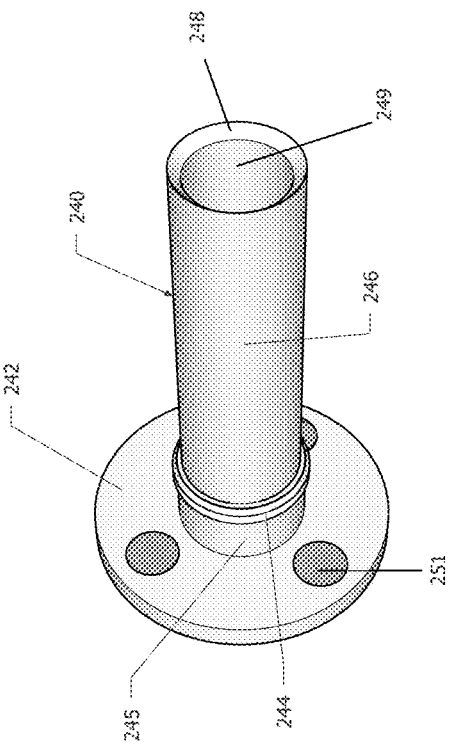
FIG. 20 shows a top isometric view of the cutting assembly 240 showing the cutting blade 248 and shaft opening 249.
Figure 19:
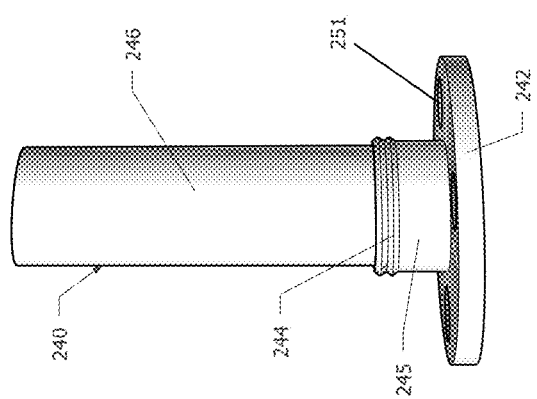
FIG. 19 represents the cutting assembly 240 in an alternate embodiment of the present invention.

In an alternate embodiment, cutting assembly 40 may not be entirely integral. In an alternate embodiment, it may be suitable to separate and mount components of the present invention in order to allow for the different components to be made of different materials. In an alternate embodiment, as seen in FIGS. 19-21, there is cutting assembly 240 similar to the aforementioned cutting assembly 40, but with components separated. Cutting assembly 240 may include a cutting base 242. Extending from cutting base 242 may be a base extension 245. At a distal end of base extension 245 may be a threaded portion 244. Threaded portion 244 may extend about a perimeter of base extension 245. Cutting base 242 may include base through holes 251 adapted to secure mounting assembly 20 to cutting assembly 240. Cutting assembly 240 may include a shaft 246 that may preferably be cylindrical. Shaft may be inserted with cutting base 242 and base extension 245. Shaft 246 may include a cutting blade 248 at a distal end of shaft 246. Additionally, a shaft opening 249 may extend a predetermined amount within shaft 246. Cutting blade 248 may be able to cut a sponge opening 84 through sponge 82. Cutting assembly 240 allows for cutting base 242 to be made of aluminum or the like as to be lightweight and inexpensive. While shaft 246 may be made of stainless steel or the like to be durable, strong and capable of cutting. This alternate embodiment allows for cost efficient production of the present invention. Cutting base 242 and shaft 246 may be mounted together with the use of heat, pressure, adhesives or the like as known in the art.

It should be understood that the present invention may be adapted to not only hold sponge 82, but the present invention may be adapted to hold scrubbing pads, or other cleaning pads or scrubs as well. It may be suitable for the present invention to hold more than one of sponge 82. It may also be suitable for the present invention to hold more than one of a scrubbing pad or the like. It may also be suitable for the present invention to holder a combination of sponge 82 and scrubbing pads.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A mounting system for a kitchen, comprising:
  a. a sponge assembly including a sponge;
  b. a mounting assembly including a suction cup, said suction cup including a base opening centrally located on said suction cup;
  c. a cutting assembly including a base and a shaft, said shaft extending from said base, said cutting assembly extending through said base opening and from said suction cup, said shaft having a distal end, said shaft having a cutting blade about a shaft perimeter at said distal end, said shaft including a shaft opening extending within said shaft, said shaft opening being between said cutting blade;
  d. a sponge opening on said sponge created using said cutting blade; and
  e. a sink assembly including a basin having basin sidewalls and a basin floor and a basin drain, said suction cup being mounted to one of said basin sidewalls, said sponge being mounted to said shaft as said sponge opening is received by said shaft to allow an efficient drainage of water from said sponge through a basin drain on said basin floor.

2. The system of claim 1 further including a cap assembly.

3. The system of claim 2, wherein said cap assembly includes a cap member that is tapered, said cap member flares outwardly at a cap base.

4. The system of claim 3, wherein said cap member includes cap threads at a lower interior surface of said cap member.

5. The system of claim 4, wherein said cap member includes a cap opening to receive said cutting assembly therein.

6. The system of claim 4, wherein said cap threads attach to a threaded portion of said base to secure said cap member to said shaft.

7. The system of claim 5, wherein said cap member receives said shaft through said cap opening to conceal said shaft to prevent said cutting blade from being exposed.

8. The system of claim 5, wherein said sponge is mounted to said cap member through said sponge opening.

9. The system of claim 1, wherein said base further includes base through holes to allow for said suction cup to mold around said base to further secure said base within said suction cup.

10. The system of claim 1, wherein said suction cup further includes a release tab protruding outwardly from the perimeter of said suction cup at a predetermined location to facilitate mounting and unmounting of said suction cup to said basin sidewalls.

11. The system of claim 6, wherein said threaded portion is located about a perimeter of said shaft at a predetermined location.

12. The system of claim 1, where said shaft is parallel to said basin floor and perpendicular to said basin sidewalls when said suction cup is mounted onto one of said basin sidewalls.

13. A mounting system for a kitchen, comprising:
  a. a sponge assembly including a sponge;
  b. a mounting assembly including a suction cup, said suction cup including a base opening centrally located on said suction cup;
  c. a cutting assembly including a cutting base with a base extension extending from said cutting base, said base extension having a threaded portion extending about said base extension at a distal end thereof, said threaded portion being around a perimeter of said base extension, said cutting assembly including a shaft of a predetermined shape, said shaft mounted to said cutting base, said shaft extending from said cutting base and being between said base extension, said base extension extending through said base opening and from said suction cup, said shaft having a distal end, said shaft having a cutting blade about a shaft perimeter at said distal end, said shaft including a shaft opening extending a predetermined distance within said shaft, said shaft opening being between said cutting blade;

d. a sponge opening on said sponge created using said cutting blade; and e. a sink assembly including a basin having basin sidewalls and a basin floor and a basin drain, said suction cup being mounted to one of said basin sidewalls, said sponge being mounted to said shaft as said sponge opening is received by said shaft to allow an efficient drainage of water from said sponge through a basin drain on said basin floor.

14. The system of claim 13, wherein said cutting base, base extension and threaded portion are made of aluminum.

15. The system of claim 13, wherein said shaft and said cutting blade are made of stainless steel.

16. The system of claim 13, wherein said cutting base further includes base through holes to allow for said suction cup to mold around said cutting base to secure said cutting base within said suction cup.

17. The system of claim 13, wherein said shaft is parallel to said basin floor and perpendicular to said basin sidewalls when said suction cup is mounted onto one of said basin sidewalls.

\* \* \* \* \*